(12) United States Patent
Robinson et al.

(10) Patent No.: US 8,729,863 B2
(45) Date of Patent: May 20, 2014

(54) BATTERY AND ENERGY MANAGEMENT CIRCUIT WITH TEMPORAL STORAGE MODE

(75) Inventors: James Robinson, Lawrenceville, GA (US); Marc Riley, Lawrenceville, GA (US)

(73) Assignee: Motorola Mobility LLC, Chicago, IL (US)

( * ) Notice: Subject to any disclaimer, the term of this patent is extended or adjusted under 35 U.S.C. 154(b) by 756 days.

(21) Appl. No.: 12/500,766

(22) Filed: Jul. 10, 2009

(65) Prior Publication Data

US 2011/0006736 A1 Jan. 13, 2011

(51) Int. Cl.
*H02J 7/00* (2006.01)

(52) U.S. Cl.
USPC .......................................... 320/134; 320/133

(58) Field of Classification Search
USPC ........................................................ 320/134
See application file for complete search history.

(56) References Cited

U.S. PATENT DOCUMENTS

| | | | |
|---|---|---|---|
| 5,173,653 A | 12/1992 | Hochstein | |
| 6,072,250 A | 6/2000 | Thandiwe et al. | |
| 6,144,186 A | 11/2000 | Thandiwe et al. | |
| 6,518,729 B2* | 2/2003 | Onishi et al. | 320/134 |
| 6,707,272 B1* | 3/2004 | Thandiwe | 320/141 |
| 6,879,133 B1 | 4/2005 | Geren | |
| 6,903,533 B1 | 6/2005 | Geren et al. | |
| 6,969,974 B1 | 11/2005 | Liu | |
| 2008/0048620 A1* | 2/2008 | Zhang | 320/134 |
| 2008/0224662 A1 | 9/2008 | Hayakawa | |
| 2009/0108808 A1* | 4/2009 | He et al. | 320/134 |

OTHER PUBLICATIONS

Radisch, Bianca "PCT Search Report and Opinion", mailed: Nov. 10, 2010 application: PCT/US2010/039291 First inventor: James Robinson Filed Jun. 21, 2010.

* cited by examiner

*Primary Examiner* — Drew A Dunn
*Assistant Examiner* — Robert Grant (57) ABSTRACT

An energy management circuit (100) for use with one or more rechargeable cells (201) is capable of prohibiting discharge in response to temporal or other inputs. In one embodiment, a control circuit (102) applies a control signal to a discharge control node (105) when a charging current is applied for less than a charging duration threshold. The control signal causes a discharge disconnect switch (202) to open. In another embodiment, the control circuit (102) applies the control signal to the discharge control node (105) after failing to detect a charging current for at least a non-charging duration threshold. Discharge can again be allowed by applying a charging current for at least a reset duration.

17 Claims, 4 Drawing Sheets

BATTERY AND ENERGY MANAGEMENT CIRCUIT WITH TEMPORAL STORAGE MODE

BACKGROUND

1. Technical Field

This invention relates generally to rechargeable batteries, and more specifically to rechargeable batteries with safety circuits.

2. Background Art

Portable electronic devices, such as cellular telephones, pagers, and two-way radios for example, derive their portability from batteries having rechargeable cells. These batteries allow these devices to slip the surly bonds of power supplies tethered to the wall and to travel wirelessly with the user wherever he may go.

While some may think that a rechargeable battery is simply a rechargeable cell and a mechanical housing, nothing could be further from the truth. Rechargeable battery packs often include circuit boards, electronic circuitry, mechanical housings or structural assemblies, and electronic or mechanical protection components. Simply put, a rechargeable battery pack is a system of components working in harmony to safely deliver power to a portable electronic device.

One of the most fundamental circuits in a battery pack is the protection circuit. Rechargeable battery performance, especially with respect to those having cells constructed of lithium-based materials, may be severely compromised if the cell within the battery pack is over or under charged. For this reason, most all battery packs today include one form of safety circuit or another. Typical safety circuits include voltage and current limits. As such, when the voltage across the cell in a battery pack becomes too high or too low, the safety circuit will open switches within the pack, thereby temporarily "turning off" the battery pack. Similarly, if the current flowing either into or out of the cell gets too high, the safety circuit will momentarily turn off the battery pack.

Not too long ago, most rechargeable battery packs were detachable from the devices they powered. For instance, a mobile telephone user could remove the battery pack from the mobile telephone for charging or replacement. However, as today's modern electronic devices are becoming smaller and smaller, many devices are integrating the rechargeable battery into the device. As such, the user does not have access to the battery pack.

One problem associated with integrated batteries is that of host current drain during storage. Some electronic devices drain small amounts of current from the battery pack even when they are OFF. As such, an issue of concern is the amount of current drain that occurs between the electronic device with the integrated battery is manufactured and the time when it is first charged by a consumer. During this time, which could be months, the circuitry in the host device can be generally consuming energy. This energy consumption causes battery discharge. If the charge level decreases too much, a condition known as over-discharge, the performance of the battery can be compromised There is a need for a battery assembly that can reduce an amount of current being drained from the battery during storage or similar conditions.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

It will be appreciated that embodiments of the invention described herein may be comprised of one or more conventional processors and unique stored program instructions that control the one or more processors to implement, in conjunction with certain non-processor circuits, some, most, or all of the functions of placing a rechargeable battery pack in a low-power or hibernate mode as described herein. As such, these functions may be interpreted as steps of a method to perform energy management in the battery pack. While some functions could be implemented with a processor executing embedded instructions in the form of code stored in memory, alternatively, some or all functions could be implemented by a state machine that has no stored program instructions, through analog or digital logic, or in one or more application specific integrated circuits with embedded logic, in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs, logic circuits, and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a method for putting a rechargeable battery into a low-power or hibernate mode for storage. Embodiments of the invention employ an energy management circuit that is capable of determining how long a charging current has been applied or, alternatively, has not been applied. For example, in one embodiment, a manufacturer can apply a charging pulse with a duration that is less than a predetermined charging duration threshold to cause the battery to go into a low-power mode. In another embodiment, if no charging current has been applied for a predetermined period, as determined by a timer within the energy management circuit, the battery will go into a low-power mode. The battery can be returned to an operational mode simply by applying a charge current for at least some predetermined time.

Embodiments of the present invention are well suited for manufacturers of rechargeable batteries that are embedded with their host devices. For instance, wireless headsets for use with portable communications are extremely small. One such device that is popular today is a Bluetooth® "ear bud" that clips on to the ear and serves as a "hands free" unit for a communication device. These devices are very small and generally include an embedded rechargeable battery that cannot be accessed or removed by the end user.

When a manufacturer builds such a product, it partially charges the battery, fixedly couples it to the electronic device, and ships it to a retailer or wholesaler. The time between manufacture can vary, but can extend into several weeks or months. It is sometimes the case that the electronic device can draw "trickle" currents, even when the device is powered off. While these currents are small, they can completely deplete a rechargeable cell. If a cell, such as a lithium-ion or lithium polymer cell, becomes too depleted, charging capability and reliability can be compromised. Where the battery is embedded, this can render the electronic device useless.

Embodiments of the present invention solve this problem by permitting the manufacturer to place the battery in a low-power or hibernate mode for storage and shipment, thereby ensuring that the battery will be operational for the end user. In one embodiment, the manufacturer applies a charging pulse with duration of between 0.4 milliseconds and 16 milliseconds, as detected by a timer in the energy management circuit. When this occurs, the energy management circuit opens a discharge switch that is coupled serially with the rechargeable cell or cells, thereby deactivating the electronic device by preventing discharge current flowing from the rechargeable cell or cells.

A user then renders the device operational by applying a charging current beyond the low-power threshold. In this illustrative embodiment, the user may apply a charging current for at least one second, thereby causing the energy management circuit to close the discharge switch. Experimental testing has shown that embodiments of the invention can extend the shelf life of small electronic devices, such as ear buds from a range of about 240 days to about 360 days, to a range of between about 1800 days and about 3300 days.

In another embodiment, if the energy management circuit determines that no charging current has been applied for some predetermined time, such as two-months or more, the energy management circuit opens the discharge switch. Such might be the case, for example, when an end user does not use, for example, an ear bud for an extended period of time. By transforming the device into a storage mode by opening the discharge switch, the energy management circuit ensures the device will be ready for use after the period of storage. The user can return the device to its operational state by applying a charging current for a reset duration which might be, for example, one second.

Figure 1:
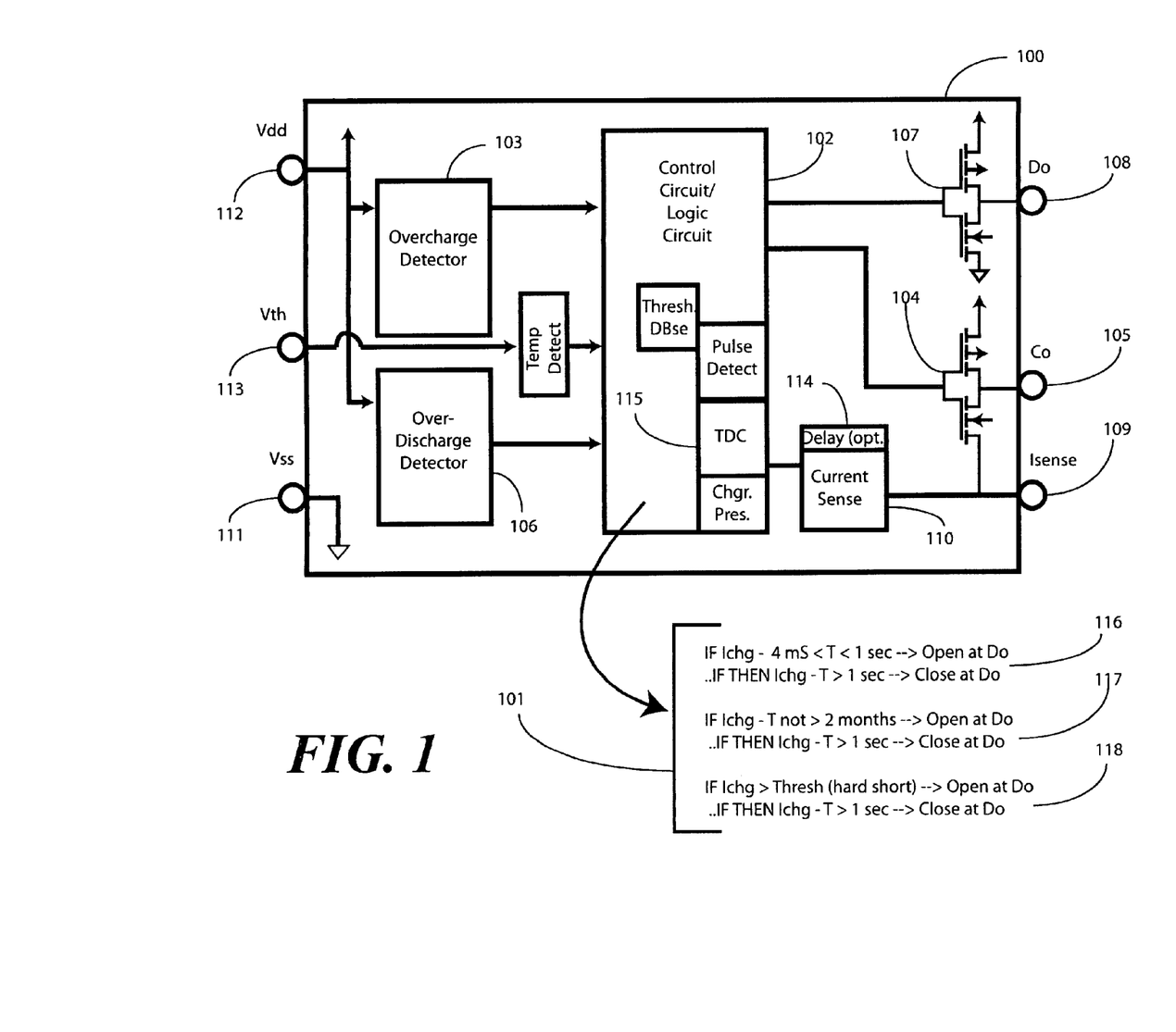
FIG. 1 illustrates one energy management circuit in accordance with embodiments of the invention.

Turning now to FIG. 1, illustrated therein is an illustrative schematic block diagram of an energy management circuit 100 in accordance with embodiments of the invention, along with logic instructions 101 that may be implemented by a control circuit 102 residing in the energy management circuit 100 as described herein. The logic instructions 101 can be implemented via embedded code that the control circuit 102 executes. Alternatively, the logic instructions 101 could be implemented in hardware as programmable digital logic, analog logic, digital logic, and so forth.

Prior to discussing the control circuit 102 and the logic instructions 101, some of the other features shown in the illustrative embodiment of FIG. 1 will be described. The illustrative embodiment of FIG. 1 shows the energy management circuit 100 configure both to manage energy depletion of the rechargeable cell or cells, and also to serve as a "safety circuit." As used herein, a "safety circuit" is any circuit capable of monitoring the voltage across at least one rechargeable cell. As is known in the art, some rechargeable batteries, such as lithium ion and lithium polymer batteries, are generally coupled with protection components to ensure that they are not overcharged. Overcharging of such batteries can compromise reliability. While the illustrative embodiment of FIG. 1 includes both safety features and energy management functions, it will be clear to those of ordinary skill in the art having the benefit of this disclosure that the invention is not so limited. The energy management circuit 100 can be implemented as a stand-alone device without safety functions. Further, while shown in FIG. 1 as an integrated circuit, embodiments of the present invention can be implemented as discrete circuits, application specific circuits, and as combinations of integrated circuits.

The illustrative energy management circuit 100 of FIG. 1 includes an overcharge detector 103. The overcharge detector 103 is configured to monitor a voltage across the rechargeable cell to which it is coupled through a Vdd node 112 and a Vss node 111. The Vdd node 112 and a Vss node 111 monitor the voltage at the cathode and at the anode of cell, respectively. For discussion purposes, embodiments of the invention will be described with the energy management circuit 100 being coupled to a single rechargeable cell, such as a single, lithium polymer cell. However, it will be obvious to those of ordinary skill in the art having the benefit of this disclosure that the invention is not so limited. The energy management circuit 100 could be used with multiple cells, coupled in series or parallel.

The overcharge detector 103 compares this sensed voltage to a predetermined maximum cell voltage threshold. When the cell voltage exceeds this threshold, the overcharge detector 103, which may work with the control circuit 102, causes a push-pull output stage 104 to apply a control signal to the charge control node 105. When the charge control node 105 is coupled to a switch, such as a MOSFET or BJT, the switch opens so as to prevent any further charging of the cell.

Similarly, the energy management circuit 100 can include an overdischarge detector 106 that ensures the voltage across the cell does not fall below a predetermined undervoltage threshold. If it does, the overdischarge detector 106 causes an output stage 107 to apply a control signal to a discharge control node 108. When the discharge control node 108 is coupled to a discharge disconnect switch coupled in series with the cell, application of the control signal at the discharge control node 108 can open the discharge disconnect switch, thereby preventing any further discharge of the cell.

In the illustrative embodiment of FIG. 1, current flowing through the cell or cells is monitored by way of a current sense node 109. The current sense node 109 is coupled to a current sensing circuit 110. In one embodiment, the current sensing circuit 110 may work with a delay circuit 114. The delay circuit 114, where used, can provide hysteresis and transient immunity for the current sense node 109.

In one mode, the current sense node 109, working with the current sensing circuit 110, senses the voltage between the Vss node 111 and the current sense node 109. When this sensed voltage exceeds a predetermined threshold, the control circuit 102 causes a control signal to be applied to the discharge control node 108. This control signal opens the discharge disconnect switch, thereby stopping the flow of current in the discharge direction.

Other components of the energy management circuit 100 include a temperature-sensing node 113. The temperature sensing node 113 may be coupled to a thermistor or other temperature-sensing device to monitor the temperature of the rechargeable cell. This may be the case, for example, where an application requires that charging of the cell only occur between the temperatures of 0 and 45 degrees centigrade.

In one embodiment of the invention, the control circuit 102 is operable with the current sense node 109 and the discharge control node 108 to transform the rechargeable battery in which the energy management circuit 100 is operating into a storage mode. As noted above, the rechargeable battery may be transformed into a storage mode during shipment and warehousing between manufacturer and retailer. Alternatively, the rechargeable battery may be transformed into a storage mode during long periods of non-use by the owner of the device to which the rechargeable battery is connected.

In one embodiment, the rechargeable battery is actively placed into a low-power, hibernate, or storage mode with the application of a charging current pulse that has less than a predetermined charging duration threshold. For example, a manufacturer may apply a charging current having duration of between four and sixteen milliseconds to cause the rechargeable battery to enter the storage mode.

The control circuit 102 detects this pulse through the current sense node 109 using a temporal determination circuit 115. The temporal determination circuit 115, which may be integrated into the control circuit 102, configured as embedded code that is executable by the control circuit 102, or which may be configured as hardware, is configured to measure the time during which current does, or does not, flow through the cell. For example, in one embodiment, the temporal determination circuit 115 is a timer that is operational with, or integrated into, the control circuit 102. In another embodiment, the temporal determination circuit 115 is configured in hardware as a resistor-capacitor circuit having a predetermined time constant. Other types of temporal determination circuits 115 will be obvious to those of ordinary skill in the art having the benefit of this disclosure.

When the control circuit 102 detects a charging current pulse having duration less than a predetermined charging duration threshold, the control circuit applies a control signal to the discharge control node 108. Where the discharge control node 108 is coupled to a discharge disconnect switch, such as a MOSFET, the control signal opens the discharge disconnect switch, thereby preventing discharge current from flowing from the cell into a load.

Examples of charging duration thresholds will vary by application. For example, in one embodiment, the charging duration threshold is 16 milliseconds. In another embodiment, the charging duration threshold is one second. In another embodiment, the charging duration threshold is one half second. The charging duration threshold can be selected by the designer to fit a particular application. Generally, the designer will select the charging duration threshold to be a short time, such as less than or equal to one second, to prevent the end user from accidentally placing the battery into storage mode.

Once the control circuit 102 causes the rechargeable battery to enter the storage or low-power mode, control circuit 102 continues to monitor for application of charging current through the current sense node 109. In one embodiment, the rechargeable battery can be "awakened" from the storage mode and returned to an operational state with the application of another charging current having duration in excess of a second charging duration threshold. When this occurs, the control circuit 102 applies a second control signal to the discharge control node 108, thereby causing the discharge disconnect switch to close.

In one illustrative embodiment, suppose the charging duration threshold is 16 milliseconds. A manufacturer places the battery into a storage mode by applying a charging current pulse having duration of 12 milliseconds, which is less than the charging duration threshold. Now suppose that the second charging duration threshold is set to be the same as the charging duration threshold, i.e., 16 milliseconds. To awaken the battery, the user applies a second charging current for at least 16 milliseconds. The control circuit 102, detecting this second charging current through the current sense node 109 and the current sensing circuit 110, and determining its duration is longer than the second charging duration threshold with the temporal determination circuit 115, applies a control signal to the discharge control node 108 by way of the push-pull output stage 107. This control signal causes the discharge disconnect switch to close, thereby rendering the attached load or electronic device operational once again.

As with the charging duration threshold, the second charging duration threshold can vary and may be selected based upon a particular application. For example, in one embodiment the charging duration threshold and second charging duration threshold can be the same. Alternatively, the second charging duration threshold can be longer than the charging duration threshold. For instance, the charging duration threshold may be 16 milliseconds, while the second charging duration threshold is one second. Generally, the designer will select the second charging duration threshold to be a relatively short time, for quick reactivation of the battery, but may make it slightly longer than the charging duration threshold to provide some hysteresis. One embodiment of the logic for opening and closing the discharge disconnect switch is illustrated at 116 in FIG. 1.

In one embodiment, the rechargeable battery is passively placed into a low-power, hibernate, or storage mode when no charging current is applied for at least a non-charging duration threshold. This passive approach may be used in the energy management circuit 100 along with the active approach described above, or independently. Also, an energy management circuit employing the passive approach can include safety components, or be a stand-alone circuit.

In the passive approach, the control circuit 102 is configured to apply a control signal to the discharge control node 108 upon failing to detect application of a charging current for at least a non-charging duration threshold. As with the charging duration threshold, the non-charging duration threshold can vary and may be selected based upon a particular application. For example, in one embodiment the non-charging duration threshold is two months. In another embodiment, the non-charging duration threshold is more than one week. In another embodiment, the non-charging duration threshold is one month. Generally, the designer will select the second charging duration threshold to be a relatively long time, such as more than several weeks, to prevent the battery from entering the storage mode too quickly.

As with the active approach, once the control circuit 102 has placed the battery into storage mode from non-use for at least the non-charging duration threshold, a user may reactivate the battery by applying a charging current for at least a predetermined period. Where both the active approach and passive approach are used in the same energy management circuit 100, the predetermined period may be the second charging duration threshold. Alternatively, it may be a different length of time. The logic for opening and closing the discharge disconnect switch in accordance with the passive approach is shown a 117 in FIG. 1.

While the above embodiments use temporal activation of the storage mode, some applications may employ different approaches for causing the battery to enter the storage mode. For example, in one embodiment the energy management circuit 100 can be configured such that the control circuit 102 detects a hard short being placed across the cell by way of the current sense node 109 and the current sensing circuit 110. Specifically, in such an embodiment, the control circuit 102 can be configured to detect a charging condition that is a charging current having a magnitude greater than a particular threshold that is indicative of a short circuit. When this occurs, the control circuit 102 can apply a control signal to the discharge control node 108, thereby causing the discharge disconnect switch to open. This action puts the battery into the storage mode.

As with other modes described above, the rechargeable battery can be "awakened" from the storage mode and returned to an operational state with the application of another charging current having duration in excess of a second charging duration threshold. When this occurs, the control circuit 102 applies a second control signal to the discharge control node 108, thereby causing the discharge disconnect switch to close. The logic corresponding to this embodiment is illustrated at 118 in FIG. 1.

Figure 2:
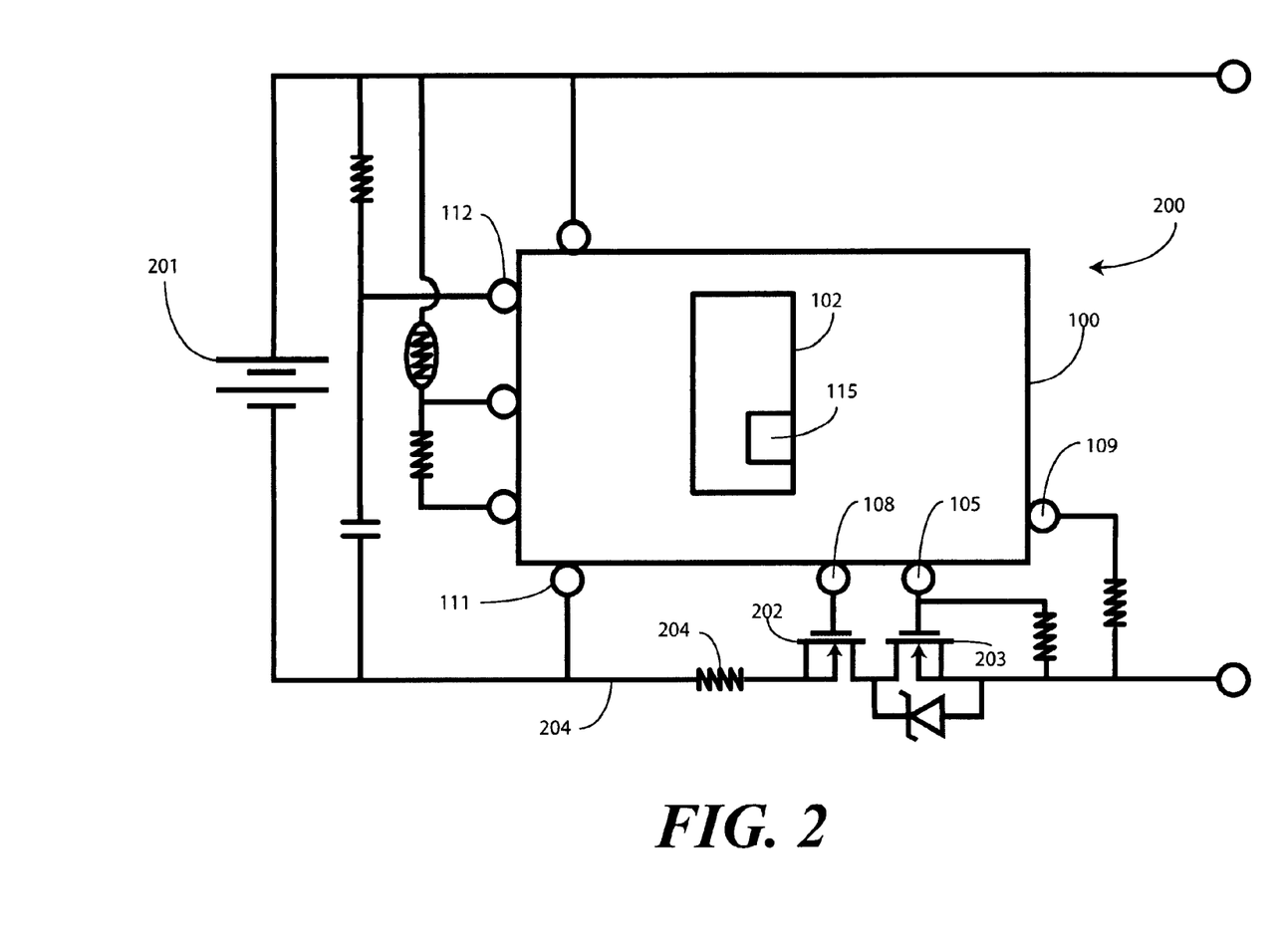
FIG. 2 illustrates one rechargeable battery employing an energy management circuit in accordance with embodiments of the invention.

Turning now to FIG. 2, illustrated therein is one embodiment of a rechargeable battery 200 using an energy management circuit 100 in accordance with embodiments of the invention. The energy management circuit 100 is coupled to one or more rechargeable cells. In the illustrative embodiment of FIG. 2, the one or more rechargeable cells are shown as cell 201. The Vdd node 112 is coupled through a current limiting resistor to the cathode of the cell 201, while the Vss node 111 is coupled to the anode of the cell 201.

In the illustrative embodiment of FIG. 2, the discharge control node 108 is coupled to a discharge disconnect switch 202. Similarly, the charge control node 105 is coupled to the charge disconnect switch 203. The discharge disconnect switch 202 and charge disconnect switch 203 are in turn coupled serially with the cell 201, and are used to prevent discharge current and charging current flowing from/to the cell 201, respectively. In the illustrative embodiment of FIG. 2, the discharge disconnect switch 202 and charge disconnect switch 203 are MOSFETs, although other devices, including switches, relays, circuit breakers and controllable fuses may be substituted, depending upon the application. MOSFETs are frequently used in battery applications due to their low serial impedance when operating in the fully on, or saturation mode.

Where MOSFETs are employed as disconnect switches, they are generally capable of prohibiting current flow in only one direction. This is the reason that two transistors are used—one to block charging current and one to block discharging current. Two transistors are required because each MOSFET has a corresponding parasitic body diode that is inherent due to its physical structure. Consequently, each MOSFET can only prevent current from flowing in a single direction. However, these body diodes are useful in accordance with embodiments of the present invention in that discharge current can be prohibited, yet charge current permitted. The body diodes of the discharge disconnect switch 202 and the charge disconnect switch 203 allow the current to flow in the other direction. To stop all current flow, therefore, both MOSFETs must be turned off. Thus the use of a charge control node 105 in addition to a discharge control node 108. When the discharge disconnect switch 202 is open, charging current may still flow through the parasitic diode of the discharge disconnect switch 202, but no discharge current flows.

The current sense node 109 is coupled to the low side 204 of the circuit, such that the current sense node 109 may work in conjunction with the Vss node 111 to sense the voltage across the discharge disconnect switch 202, the charge disconnect switch 203, an optional current sense resistor 205, or combinations thereof. When this voltage becomes too high, an optional overcurrent prevention circuit of the control circuit 102 detects that the current being drawn from the cell 201 is correspondingly too high. When this occurs, the control circuit 102 applies a control signal to the discharge control node 105, thereby causing the discharge disconnect switch 202 to open. The control circuit 102 then periodically momentarily closes the discharge disconnect switch 202 to determine whether the current is still too high. When sensing that it is not, the control circuit 102 leaves the discharge disconnect switch 202 closed.

The control circuit 102 is configured to put the rechargeable battery 200 in a storage mode by using the current sense node 109 as well. In one embodiment, rather than temporarily opening the discharge disconnect switch 202 in response to the overcurrent prevention circuit, the control circuit 102 may leave the discharge disconnect switch 202 open, thereby placing the rechargeable battery 200 in a storage mode, when sensing a charging current exceeding a threshold, such as 5 Amperes or more.

In other embodiments, the energy management circuit 100 places the rechargeable battery 200 into storage mode in response to temporal information. Specifically, the control circuit 102 uses not only the current sense node 109 to sense current, but the temporal determination circuit 115 as well to determine the duration at which the currents flow.

As noted above, this placement into storage mode can be actively accomplished or passively accomplished. Further, the active and passive mechanisms can be operational in a single energy management circuit.

In the active embodiment, upon detecting a predetermined charging condition such as a charging pulse having duration less than a charging duration threshold, the control circuit 102 is configured to apply a control signal to the discharge control node 105 that causes the discharge disconnect switch 202 to open. In another embodiment, upon detecting a predetermined charging condition such as failing to detect a charging current for at least a predetermined non-charging duration threshold, the control circuit 102 is configured to apply a control signal to the discharge control node 105 that causes the discharge disconnect switch 202 to open.

To reactivate the battery, the control circuit 102 monitors for a charging current to be applied for a predetermined amount of time. For example, when the control circuit 102 detects through the current sensing node 109 that a charge current has been applied for at least a predetermined reset time, the control circuit 102 can apply a control circuit to the discharge control node 105 to cause the discharge disconnect switch 202 to close.

Figure 3:
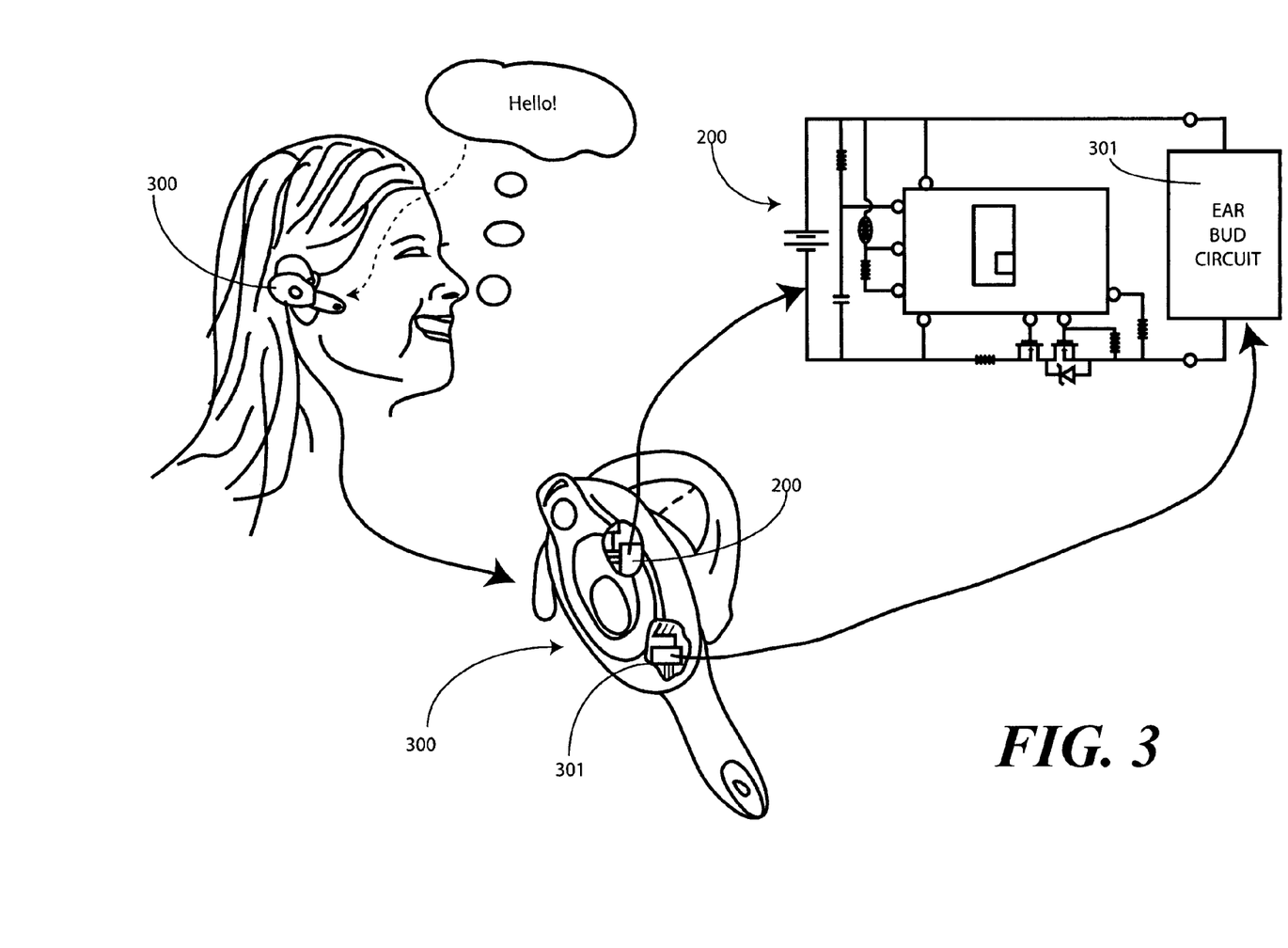
FIG. 3 illustrates one electronic device having an embedded rechargeable battery employing an energy management circuit in accordance with embodiments of the invention.

Turning now to FIG. 3, illustrated therein is one example of an application for a rechargeable battery 200 in accordance with embodiments of the invention. In FIG. 3, the rechargeable battery 200 has been fixedly coupled to the circuitry 301 of an electronic device 300, which is a wireless ear bud. While being fixedly coupled as an internal battery in a wireless ear bud is useful in showing one application of embodiments of the invention, it will be clear to those of ordinary skill in the art having the benefit of this disclosure that the invention is not so limited. An ear bud is used for illustration only.

When the control circuit (102) puts the rechargeable battery 200 puts into a storage mode, the discharge disconnect switch (202) is open, thereby preventing current from flowing from the cell (201) to the circuitry 301 of the electronic device 300. As such, the electronic device 300 is deactivated when the rechargeable battery is placed in a storage mode. By applying a charging current to the rechargeable battery, the user may "reactivate" the electronic device 300 by causing the discharge disconnect switch (202) to close.

Figure 4:
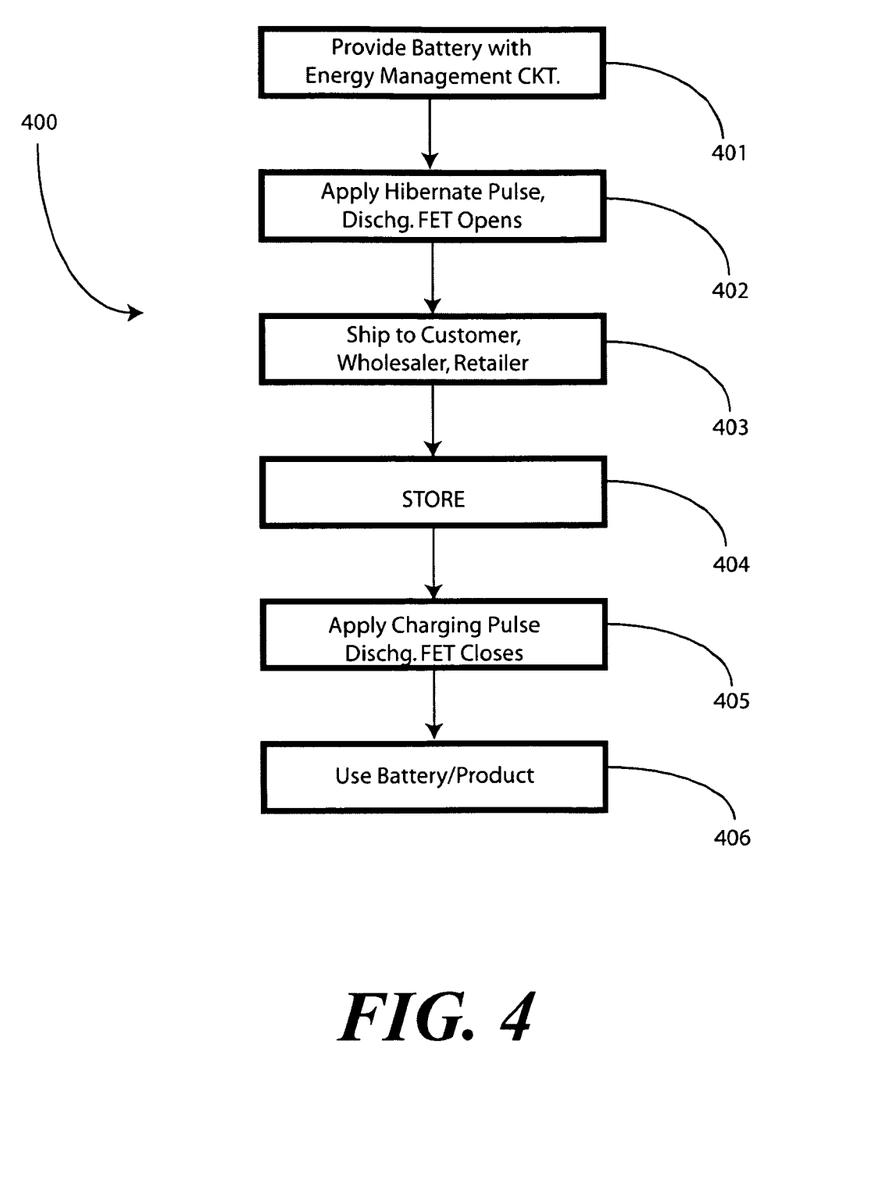
FIG. 4 illustrates one method for using an energy management circuit in accordance with embodiments of the invention.

Turning now to FIG. 4, illustrated therein is one method 400 for actively placing a rechargeable battery (200) into a storage mode in accordance with embodiments of the invention. As noted above, such a method can be used by a manufacturer prior to shipping the rechargeable battery (200), or alternatively an electronic device (300) coupled to the rechargeable battery (200), to a wholesaler or retailer.

At step 401, the rechargeable battery (200) having the energy management circuit (100) therewith is provided, manufactured, or otherwise procured. At step 402, the manufacturer applies a charging current pulse having less than a charging current duration threshold. For example, if the charging current duration threshold is one second or less, the manufacturer may apply a pulse of 0.25 seconds. When this occurs, the control circuit (102) of the energy management circuit (100) applies a control signal to the discharge control node (105), thereby causing the discharge disconnect switch (202) to open. The electronic device (if present) becomes inactive.

At step 403, the manufacturer can ship the rechargeable battery (200) and/or electronic device (300) to a customer, wholesaler, or retailer at step 403. The rechargeable battery (200) and/or electronic device (300) is stored for some time at step 404.

To awaken the rechargeable battery (200) and/or reactivate the electronic device (300), a charging pulse is applied at step 405 for at least a predetermined reset duration. The reset duration threshold may be set, for example, to one-half second. Thus, when a charging current is applied for one-half a second or more, the control circuit (102) applies a control signal to the discharge control node (105), thereby causing the discharge disconnect switch (202) to close. The user may then use the rechargeable battery (200) at step 406.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An energy management circuit for coupling to one or more rechargeable cells, the energy management circuit comprising:
    a control circuit, operable with:
        a current sense node configured to sense a current flowing through the one or more rechargeable cells;
        a temporal determination circuit;
        a current sense node; and
        a discharge control node configured to control a discharge disconnect switch coupled serially with the one or more rechargeable cells;
    wherein the control circuit is configured to, upon detecting a predetermined charging condition, apply a control signal configured to open the discharge disconnect switch at the discharge control node until at least detecting application of a charging current for at least a reset duration threshold;
    the predetermined charging condition comprising failing to detect, from the current sense node and the temporal determination circuit the charging current for at least a predetermined non-charging duration threshold.

2. The energy management circuit of claim 1, further comprising a temporal determination circuit, wherein the control circuit is configured to detect the non-charging duration threshold from the temporal determination circuit.

3. The energy management circuit of claim 1, wherein when the control circuit is further configured to, upon detecting a charging current pulse having more than a second charging duration threshold, apply a second control signal causing the discharge disconnect switch to close at the discharge control node.

4. The energy management circuit of claim 3, wherein the charging duration threshold is less than or equal to the second charging duration threshold.

5. The energy management circuit of claim 4, wherein the charging duration threshold is between four milliseconds and sixteen milliseconds.

6. An energy management circuit for coupling to one or more rechargeable cells as a rechargeable battery, the energy management circuit comprising:
    a control circuit, operable with:
        a current sense node configured to sense a current flowing through the one or more rechargeable cells; and
        a discharge control node configured to control a discharge disconnect switch coupled serially with the one or more rechargeable cells;
        a temporal determination circuit operable with the control circuit;
    wherein the control circuit is configured to, upon detecting a predetermined charging condition, apply a control signal configured to open the discharge disconnect switch at the discharge control node at least until detecting application of a charging current for at least a reset duration threshold;
    wherein the predetermined charging condition comprises failing to detect, from the current sense node and the temporal determination circuit, the charging current for at least a predetermined non-charging duration threshold.

7. The energy management circuit of claim 6, wherein the reset duration threshold is less than the predetermined non-charging duration threshold.

8. The energy management circuit of claim 7, wherein the reset duration threshold is ten minutes or less.

9. The energy management circuit of claim 7, wherein the predetermined non-charging duration threshold is more than one week.

10. The energy management circuit of claim 6, wherein the control circuit is further configured to, upon detecting a charging current pulse having a duration less than a charging duration threshold, apply the control signal causing the discharge disconnect switch to open at the discharge control node.

11. A rechargeable battery pack, comprising:
 at least one rechargeable cell;
 a switch coupled serially with the at least one rechargeable cell;
 a discharge control node to control the switch;
 a current sense node;
 a temporal determination circuit; and
 a control circuit coupled to the switch and the at least one rechargeable cell, wherein the control circuit is configured to sense a predetermined condition comprising failing to detect with the current sense node and the temporal determination circuit, a charging current for at least a predetermined non-charging duration threshold and upon sensing the predetermined condition, to apply a control signal to open the switch at the discharge control node until detecting application of the charging current for at least a reset duration threshold.

12. The rechargeable battery pack of claim 11, wherein the switch, when open, is configured to permit a charging current through the at least one rechargeable cell, and prohibit a discharge current through the at least one rechargeable cell.

13. The rechargeable battery pack of claim 11, the control circuit configured to cause the switch to remain open until detecting the application of the charging current for the at least a reset duration threshold.

14. The rechargeable battery pack of claim 11, further comprising an electronic device fixedly coupled to the rechargeable battery pack.

15. The rechargeable battery pack of claim 14, wherein the electronic device is deactivated when the switch is open.

16. The rechargeable battery pack of claim 11, wherein the control circuit further comprises an overdischarge detector coupled to, and configured to sense a cell voltage across, the at least one rechargeable cell, wherein upon the overdischarge detector sensing that the cell voltage is beneath a discharge voltage threshold, the control circuit is configured to cause the switch to open.

17. The rechargeable battery pack of claim 11, further comprising a second switch coupled serially with the at least one rechargeable cell and an overcharge detector coupled to and configured to sense a voltage across the at least one rechargeable cell, wherein upon the overcharge detector sensing that a cell voltage is above a maximum voltage threshold, the control circuit is configured to cause the second switch to open.

\* \* \* \* \*